United States Patent [19]

Werner

[11] Patent Number: 5,043,982

[45] Date of Patent: Aug. 27, 1991

[54] MULTICHANNEL MULTIPOINT NETWORK USING TIME-DIVISION MULTIPLEXING INCORPORATING A TIME OFFSET FOR PROPAGATION DELAY

[75] Inventor: Jean-Jacques Werner, Holmdel, N.J.

[73] Assignee: AT&T Bell Laboratories, Murray Hill, N.J.

[21] Appl. No.: 356,168

[22] Filed: May 24, 1989

[51] Int. Cl.[5] .............................................. H04J 3/06
[52] U.S. Cl. .................. 370/100.1; 370/108; 375/109
[58] Field of Search ............... 370/85.1, 100.1, 103, 370/105.1, 108; 375/109

[56] References Cited

U.S. PATENT DOCUMENTS

| | | | |
|---|---|---|---|
| 4,562,573 | 12/1985 | Murano et al. | 370/85.1 |
| 4,601,030 | 7/1986 | Croisier | 370/85.1 |
| 4,694,453 | 9/1987 | Kobayashi et al. | 370/85.1 |
| 4,726,017 | 2/1988 | Krum et al. | 370/85 |
| 4,773,065 | 9/1988 | Kobayashi et al. | 370/85.1 |
| 4,797,878 | 1/1989 | Armstrong | 370/96 |

*Primary Examiner*—Benedict V. Safourek
*Assistant Examiner*—Wellington Chin
*Attorney, Agent, or Firm*—David R. Padnes

[57] ABSTRACT

Time-division multiplexing (TDM) is used for communications between each remote location and the central location of a multichannel, multipoint polling network. Each remote location transmits data in a TDM frame which has predetermined time intervals for each channel or application. The duration and order of these time intervals are the same for each remote location. However, to avoid collisions between arriving data at the central location, the TDM frame used at each remote location is offset relative to the TDM frame at the central location by a time interval equal to the propagation delay for communications between that remote location and the central location. As a result, data for each application arrives at the central location in nonoverlapping time intervals and data collision is avoided.

20 Claims, 6 Drawing Sheets

TYPICAL MULITPOINT NETWORK

200

MULTICHANNEL MULTIPOINT NETWORK USING TIME-DIVISION MULTIPLEXING INCORPORATING A TIME OFFSET FOR PROPAGATION DELAY

TECHNICAL FIELD

The present invention relates to communications systems and, more particularly, to a multichannel, multipoint polling network which utilizes time-division multiplexing for communications from the remote locations to the central location.

BACKGROUND OF THE INVENTION

Communication systems can be classified as either multipoint or point-to-point. In the latter, any given transceiver, i.e., transmitter/receiver unit, can only communicate with one other transceiver while in the former a transceiver at a central location can communicate with a plurality of other transceivers each located at a different remote location. The term "polling," when used with such networks, indicates that the transfer of data from each remote location follows a poll or request for a response by the central location to that remote location. "Multichannel" is a term which indicates that the data coupled to the central location from a particular remote location is associated with more than one information source or, if associated with the same source, is segregated and processed separately by the communication system. Examples of multichannel data in the banking industry is data associated with teller, automated teller machine and security services.

The difficulty with the implementation of a multichannel, multipoint polling network lies in the fact that each channel or application has to run independently; that is, polling of each application and the communications coupled to the central location in response thereto should proceed without disruptive interference from the other applications.

In one prior art approach, this independence is achieved by providing a separate multipoint network for each application. That is, for n applications, n multipoint networks are required. Obviously, the cost of providing this solution varies directly with n and can exceed system cost objectives even when n is 2 or 3.

Another prior art technique is to physically divide the frequency band available for remote-to-central location communications into smaller frequency bands. Each of these smaller frequency bands is then used as a data channel for one of the multipoint polling applications. This technique is known as frequency-division multiplexing (FDM). While frequency-division multiplexing provides satisfactory performance in many multichannel, multipoint network applications, such an arrangement does not readily permit dynamic bandwidth allocation for each application. In addition, the equipment required in each transceiver, i.e., transmitting and receiving unit, is essentially a multiple of that required for a single application. For example, for three applications, each associated with a different frequency band, each transceiver essentially includes three separate transmitters and receivers. This equipment requirement, coupled with the difficulties associated with bandwidth reallocation of each application over time, makes the use of FDM unsuitable for certain multichannel, multipoint network applications. Furthermore, FDM is not feasible with polling systems using digital rather than analog voiceband communication facilities.

Accordingly, it would be extremely desirable if a technique were developed for multichannel, multipoint applications that would readily permit bandwidth reallocation of each application, could be easily implemented without significant equipment costs, and could be used with digital communication facilities such as AT&T's Digital Data Service (DDS).

SUMMARY OF THE INVENTION

To overcome the shortcomings of the prior art, time-division multiplexing (TDM) is used for remote-to-central location communications in a multichannel, multipoint polling network. To prevent data collisions which render the received data unintelligible in such communications, each remote transmits information for each application in disjoint time intervals of a recurring TDM frame. In addition, the propagation delay for communications between each remote location and the central location is measured and is then used to assure that the signals received at the central location from each remote location arrive in nonoverlapping time intervals allocated to each application. This is accomplished by having each remote location transmit information in a TDM frame which is offset relative to the TDM frame at the central location by a time interval equal to the propagation delay for communications between that remote location and the central location.

DETAILED DESCRIPTION

Figure 1:
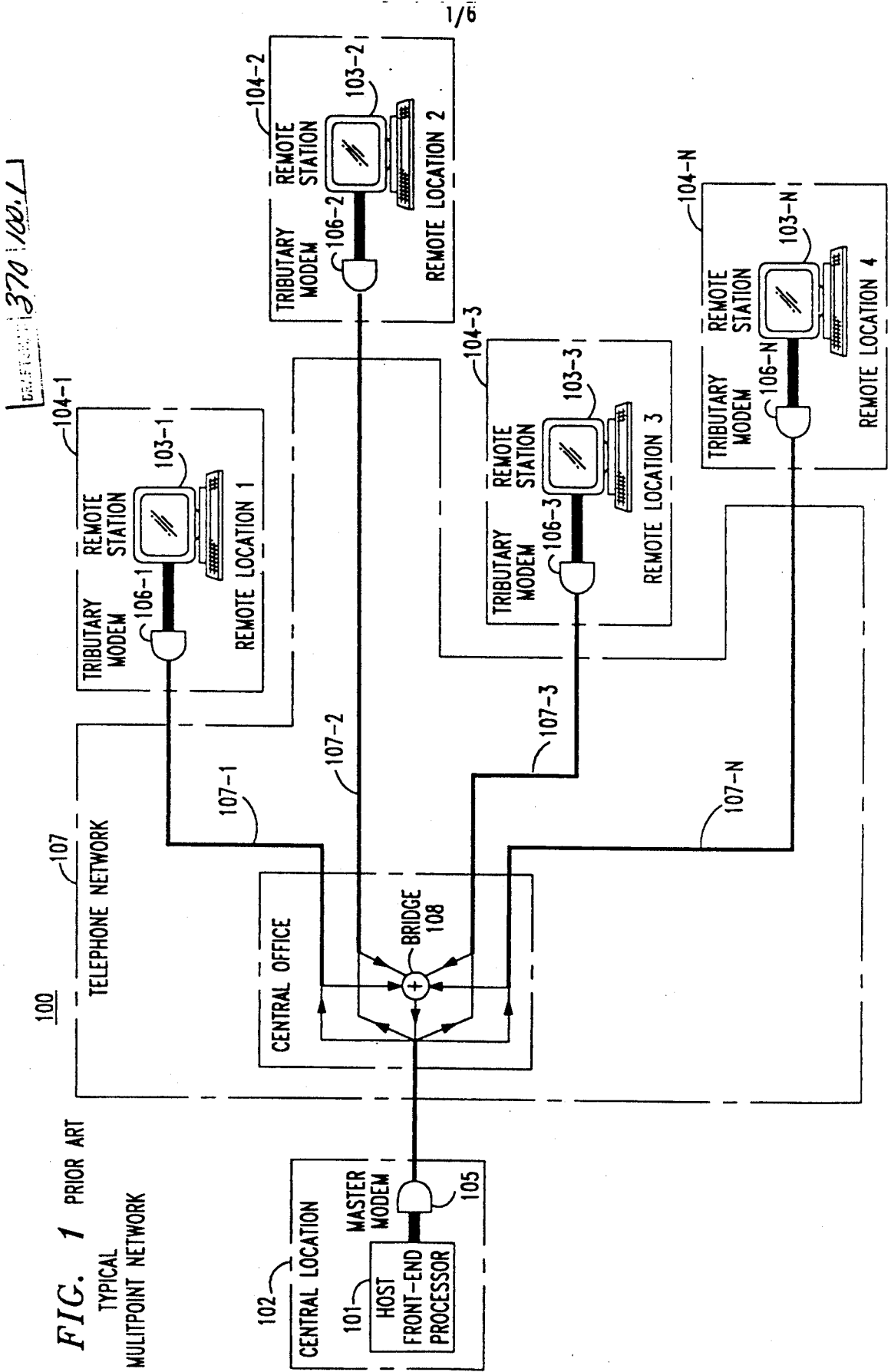
FIG. 1 is a block-schematic diagram of a prior art multipoint network.

A prior art single-channel multipoint polling network 100 is shown in FIG. 1 wherein host front-end processor 101 at central location 102 communicates with a plurality of remote stations 103-1 ... 103-N. Each of the remote stations has the capability of generating and/or transmitting digital data and is located at a respective one of remote locations 104-1 ... 104-N. Each remote station includes a workstation at which an individual or machine interacts with the communications system and can also include a cluster controller, a well-known device, which interfaces a plurality of workstations at a remote location to the modem at that remote location hereinafter referred to as a tributary modem.

Since digital data cannot be transmitted directly over a data transmission line, such as a telephone line, the host front-end processor is associated with a master modem 105 and each remote station is respectively associated with a tributary modem 106-1 ... 106-N. Each modem acts to convert these digital signals to a form which can be transmitted over each tributary modem's associated data transmission channel 107-1 . . . 107-N of telephone network 107. For example, frequency modulation, phase modulation or quadrature-amplitude modulation schemes, which are wellknown, can be used to impress data over a band-limited telephone line.

For communications from the host front-end processor to the remote stations, communications pass through a master modem 105 at the central location and thence through telephone network 107 to tributary modems 106-1 through 106-N which are respectively associated with remote stations 103-1 through 103-N. Within the front-end processor, a polling device (not shown) periodically addresses each of the remote stations and requests a response from that remote station. During the response, the polling device will lock onto the associated data channel and allow the response from the transmitting tributary modem to be coupled to the master modem and thence to the host front-end processor. When the response is complete, the polling device will recommence its polling of the remote stations.

It should be noted that communications from the central location to each of the remote locations operate in a broadcast mode, i.e., the central modem transmits the same data to each of the remote locations along with an address which identifies the remote station for which the data is intended. For communications from each of the remote locations to the central location, data is coupled from each remote station through the associated tributary modem to a bridge 108 and thence through the master modem to the host front-end processor. Bridge 108, typically located in a telephone central office, combines the signals on its inputs and couples the result to the master modem. For voiceband modems, the bridge is an adder. In digital applications, such as DDS, bridge 108 is functionally equivalent to a logic AND gate. Thus, in order to avoid data collisions which render the colliding data unintelligible, it is important that only one remote location at a time transmits data to the master modem. This is usually guaranteed by standard polling protocols. There is no problem in the opposite direction for transmission in this direction is in a broadcast mode.

When multichannels are desired in a multipoint polling network, one brute force approach is to utilize a separate multipoint polling network, as shown in FIG. 1, for each application. This approach can become rather costly from an equipment and maintenance standpoint as the number of channels or applications increases. Another more recent approach is to utilize frequency-division multiplexing for communications between the remote locations and the central locations. This technique is rather inflexible for reallocating the bandwidth reserved for each channel and cannot be used for digital communications systems.

It is the aim of the present invention to accommodate two or more independent applications on a single multipoint network in a manner which readily permits reallocation of the bandwidth for any application and can be used for digital communications systems. As will be discussed, this is accomplished through the use of TDM for communications from any remote location to the central location.

Figure 2:
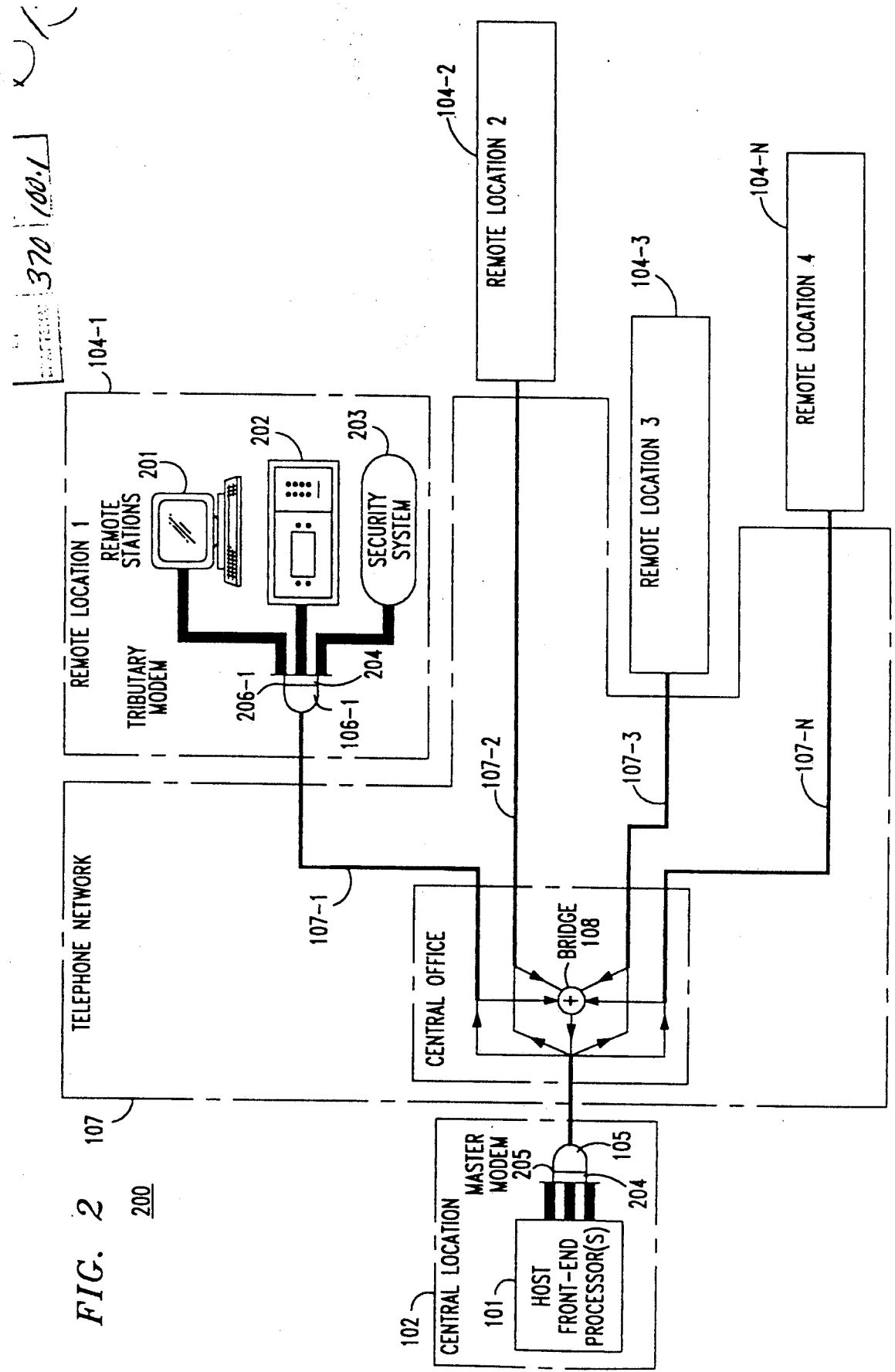
FIG. 2 is a block-schematic diagram of a multichannel, multipoint network which utilizes TDM in accordance with the present invention.

Refer now to FIG. 2 which illustrates an illustrative multichannel, multipoint network 200 for a banking application in accordance with the present invention. Network 200 is similar in many respects to network 100, and, in this regard, the same reference numerals have been repeated in FIG. 2 where they refer to elements having substantially identical structure and function to that described in reference to FIG. 1.

In FIG. 2, three channels or applications are provided. Data associated with teller, automated teller and security services are respectively coupled from remote stations 201, 202 and 203. These remote stations are located in each of remote locations 104-1 through 104-N. Tributary modems, each located at a different remote location, such as tributary modem 206-1 at location 104-1, interface the remote stations located at that remote location to telephone network 107 while master modem 205 provides this interface function for host front-end processor 101. As with FIG. 1, each remote station can be a workstation where an individual or machine interacts with the multipoint network and can also be a cluster controller which interfaces a plurality of workstations at a remote location to the tributary modem at that remote location.

Each tributary modem includes the tributary modem of FIG. 1, also referred to as a "core" modem, along with an adjunct 204. The adjunct apparatus for each tributary modem at a remote location interfaces the associated core modem with the plurality of remote stations at a remote location. Similarly, the master modem 205 includes the master modem 105 of FIG. 1 along with the adjunct 204. At the central location, the adjunct is disposed between the host front-end processor and the master modem 105.

In network 200, as with network 100 of FIG. 1, communications from the host front-end processor to each remote location operate in the broadcast mode and the polling of each application is independent of any other except that for any given application, "A", "B" or "C", only a single remote location can be polled at any given time. If not, data collisions will occur that will render the unintelligible received data at the central location. Otherwise, the order in which applications are polled is determined by the host front-end processor and is not constrained. For example, at any given time, either the teller, automated teller machine or security application can be polled at any one remote location. However, different applications can be independently polled at different remote locations. That is, one application can be polled at one location and independent of any response from that location or the completion of any response, another application can be polled at either the same or a different remote location. Were nothing done, this polling independence could also give rise to collisions between data arriving at the central location. However, this occurrence, as will be discussed, is avoided by the TDM scheme utilized by the present invention.

Figure 3:
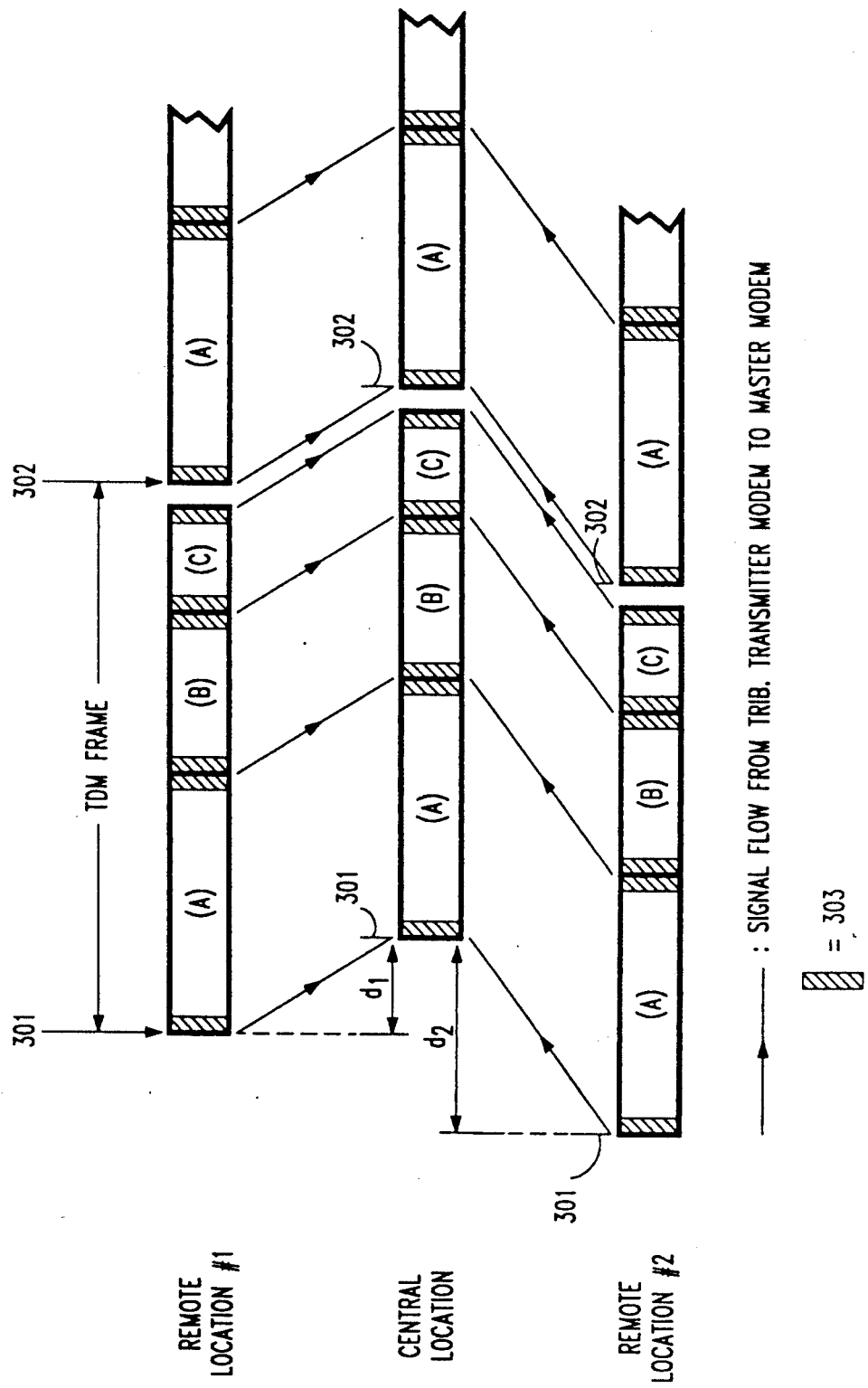
FIG. 3 is a time diagram which illustrates the TDM frames at each of two remote locations relative to that at the central location.

Refer now to FIG. 3 which graphically illustrates how TDM is utilized for remote-to-central location communications in the present invention. The modem at the central location and each remote location has an established absolute time reference, using flags 301 and 302, to define a TDM frame. In FIG. 3, the TDM frames for the master modem at the central location and for two tributary modems each at a different remote location are shown. Each frame for each modem has at least one predetermined time interval for each application. In the illustrative embodiment, there are three applications--one for teller services, one for automated teller services and yet another for security services. In FIG. 3, these services are respectively designated as A, B and C. In other words, whenever a tributary modem transmits information to the master modem for any application, that information is placed into the time interval allocated for that application. The time allocated for each application is flexible and can be readily varied. Note that the duration and order of these time intervals are the same for each modem. In addition, it should be remembered that the transmission of data associated with an application is in response to a poll from the central location and that, once polled, an application at any remote location is not polled again at that remote location or any other remote location until all data in response to that poll is received at the central location. For each response from a remote location, some delay for data transmission is usually required to assure that data is transmitted in the time interval allocated at the remote location to the application for which the response is intended. However, except for these random delays which are conveniently performed by adjunct modem 204 in FIG. 2, the polling of different applications at different remote locations is independent. That is, application A at remote location 2 can be polled by the central location immediately after a poll for application B at remote location 1 regardless of the completion of any response from remote location 1 associated with application B. Were nothing else done, there would still be a possibility of collisions between data arriving at the central location due to the differences in propagation delay for communications from each remote location to the central location. To avoid this occurrence, the TDM frame for each tributary modem is offset with respect to the TDM frame for the master modem by a fixed time interval $d_i$, where i is an index denoting the remote location, that interval being equal to the propagation delay between remote location i and the central location. Use of such offsets assures that the data arriving at the central location arrives for each application in its predetermined time interval within each frame and does not overlap onto the time interval for another application. In short, the offsets assure that the data for each application arriving at the central location arrives in the associated nonoverlapping time intervals.

The time intervals for services A, B and C each comprise at least one time slot in a TDM frame. Each time slot is conveniently taken equal to an integral number of bit periods. It is preferable that these time intervals not be completely filled with application data in order to avoid data collisions at the central location either during start-up or at the end of transmission for voiceband modem applications and to account for errors in the determination of the correct propagation delay offset for each TDM frame for such modem applications and for digital applications, such as DDS. Accordingly, a time interval, designated as guard band 303, in which no data is transmitted to the central location, is inserted at the beginning and end of each time interval for each application. The time duration of each guard band is the same for the TDM frame for each modem. It is also advantageous for certain applications that a time period 304 be inserted after every n frame, where n is a positive integer. Interval 304 can be used for communicating ancillary information from the remote locations to the central location. For example, interval 304 could be used for occasionally remeasuring the propagation delay between each remote location and the central location.

Figure 4:
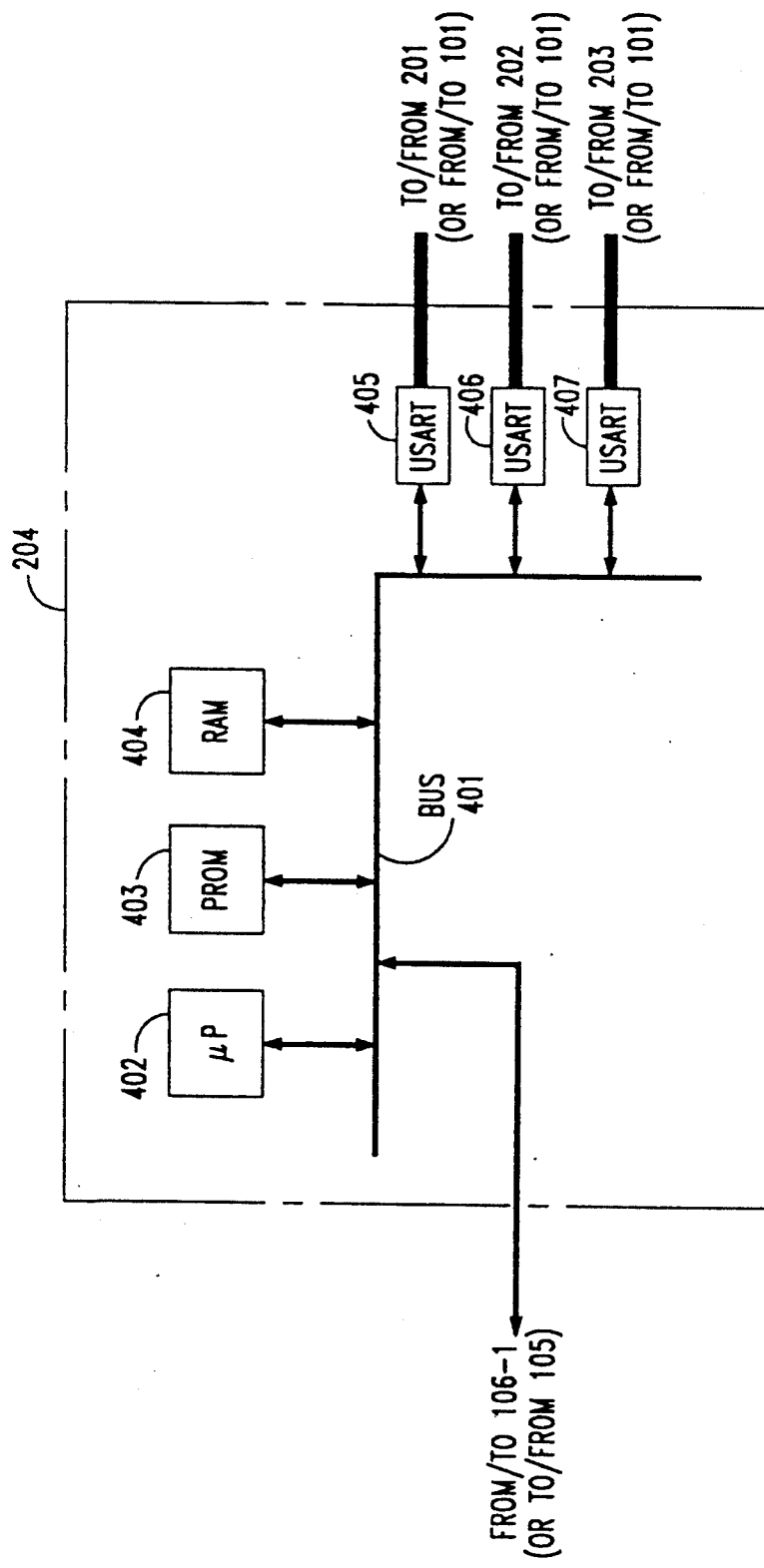
FIG. 4 is a block-schematic diagram of the modem adjunct added to each modem of FIG. 2 in accordance with the present invention.

FIG. 4 shows a block-schematic diagram of adjunct 204. Adjunct 204 includes microprocessor 402 ($\mu$P), programmable read-only memory (PROM) 403 and random access memory (404) which are interconnected by microprocessor bus 401. This adjunct can be used in a master modem at the central location or with a tributary modem at a remote location. In the latter case, bus 401 is connected to a tributary modem at one end and to universal synchronous-asynchronous receiver transmitters (USARTs) 405, 406 and 407 at another end. Each of these USARTs is connected to a different one of the remote stations 201, 202 and 203. When disposed at a central location, bus 401 is connected to master modem 105 at one end and to the host front-end processor via USARTs 405-407 at the other end.

The USARTs are well-known interface devices which provide serial-to-parallel conversion and vice versa and synchronization. The PROM and RAM provide memory capability and store the different programs executed by microprocessor 402.

Figure 5:
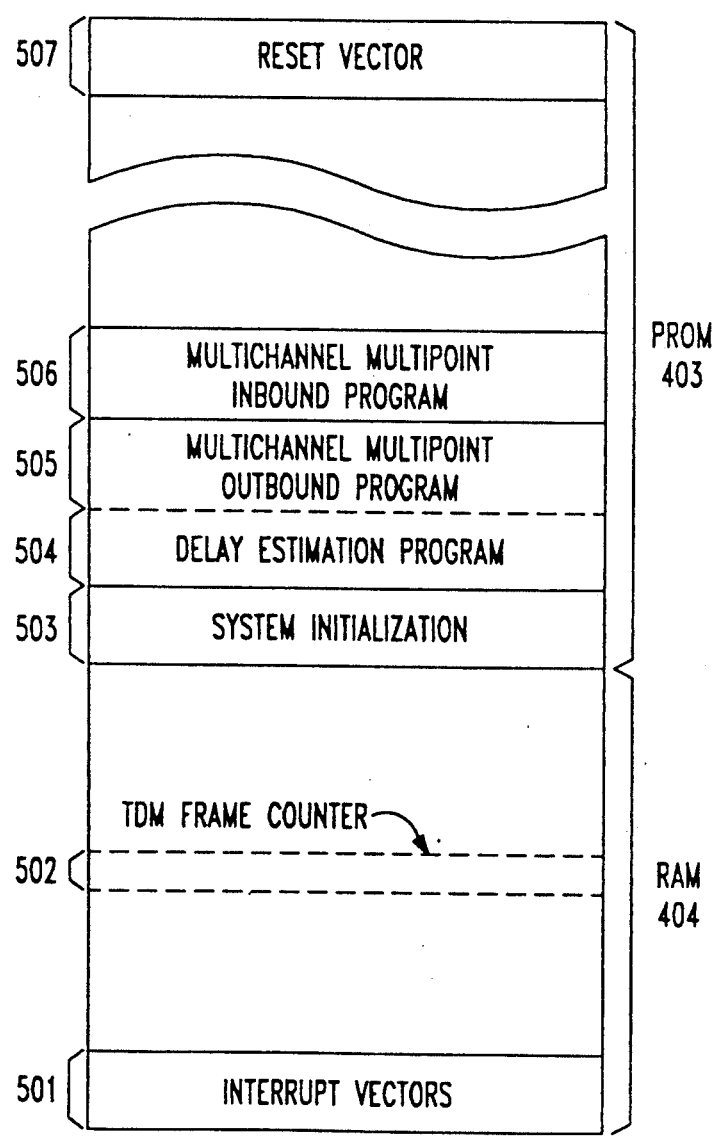
FIG. 5 is a memory map of PROM 403 and RAM 404 of FIG. 4.

FIG. 5 shows a memory map of PROM 403 and RAM 404. Portions 501 and 502 of the RAM memory are used to respectively store interrupt vectors and to store the count of a TDM frame counter. Other portions may be used to provide transient and miscellaneous storage. The TDM frame counter itself is provided by microprocessor 402 via software and the purpose of such a counter will be explained in greater detail hereinbelow. At this juncture, it is sufficient to note that the counter is used to provide the appropriate offset between the TDM frame at each remote location relative to the TDM frame at the central location.

PROM 403 stores several programs executable by microprocessor 402. One of these programs provides the measurement and computation of the propagation delay between each remote location and the central location and is stored in PROM memory locations 504. The actual operation of the adjunct for central-to-remote location transmission is controlled by a multichannel, multipoint "outbound" program stored at memory addresses 505 while operation of the adjunct for remote-to-central location transmission is controlled by a multichannel, multipoint inbound program stored at memory locations 506. These programs control operation of the USARTs by notifying them when each can receive and transmit data. PROM 403 also provides system initialization parameters which are stored at memory locations 503 and a reset vecotor, stored at memory location 507, which "reboots" the microprocessor 402.

Some of the main functions of outbound program 505 and inbound program 506 are now briefly discussed in reference to communications between the central location and remote location 1. Communication between the central location and the other remote locations is similar.

At the central location, the outbound program of adjunct modem 204 multiplexes in time the bit streams, corresponding to the different applications, that are provided by host front-end processor(s) 101. This time multiplexing of lower speed bit streams onto a higher speed bit stream is well-known art. Advantageously, adjunct modem 204 may also interleave some ancillary data with the applications data, and the resulting bit stream is then fed to modem 105 for transmission over telephone circuit 107-1. At the remote location, modem 106-1 recovers the data transmitted by modem 105 and passes them to adjunct modem 204. Outbound program 505 of adjunct modem 204 then demultiplexes the received bit stream in a standard fashion. Data corresponding to stations 201–203 are passed through USARTs 405–407, respectively, and if ancillary information is also transmitted between central and remote locations, this information is conveniently stored in RAM 404 for further processing.

Multichannel, multipoint inbound program 506 also multiplexes data, in adjunct modem 204 at remote location 104-1, and demultiplexes data, in adjunct modem 204 at central location 102, in accordance with the present invention. At remote location 104-1, inbound program 506 keeps monitoring the control signals provided by USARTs 405–407 to determine if any of the stations 201–203 has made a request to transmit data. If such a request is being made, by station 201 for example, inbound program 506 computes the difference between the present value of TDM frame counter 502 and the count at which the time interval allocated to application A becomes available. Depending on the value of this difference, inbound program 506 can provide a clear-to-send signal to remote location 201 through USART 405 for immediate data transmission, or employ a variety of delaying tactics. For example, the clear-to-send signal can be delayed by the appropriate number of counts until the time interval allocated to application A becomes available, or it may not be delayed and, instead, the data passed from remote station 201 through USART 405 may be stored and buffered in RAM 404 until the time interval allocated to application A becomes available. Once this time interval become available, adjunct modem 204 passes the data to modem 106-1 for standard transmission over communication link 107-1.

At central location 102, the multichannel, multipoint inbound program 506 of adjunct modem 204 keeps monitoring modem 105 through bus 401 to determine if modem 105 has received any data. If such data have been received, they are passed by adjunct modem 204 to front-end processor(s) 101 through either one of USARTs 405–407, depending on the present value of TDM frame counter 502.

If one considers that each TDM frame can be defined by a counter which clocks off each time slot, then the beginning of a frame can be indicated by a "one" count and the end of the frame by some arbitrary count. Each of the time intervals for applications A, B and C and the preferable guard bands 303 and time interval 304 in the illustrative embodiment are then associated with other counts. With this understanding, the necessary offset $d_i$ can be provided by offsetting the count of a TDM frame counter at each remote location relative to one at the central location.

Figure 6:
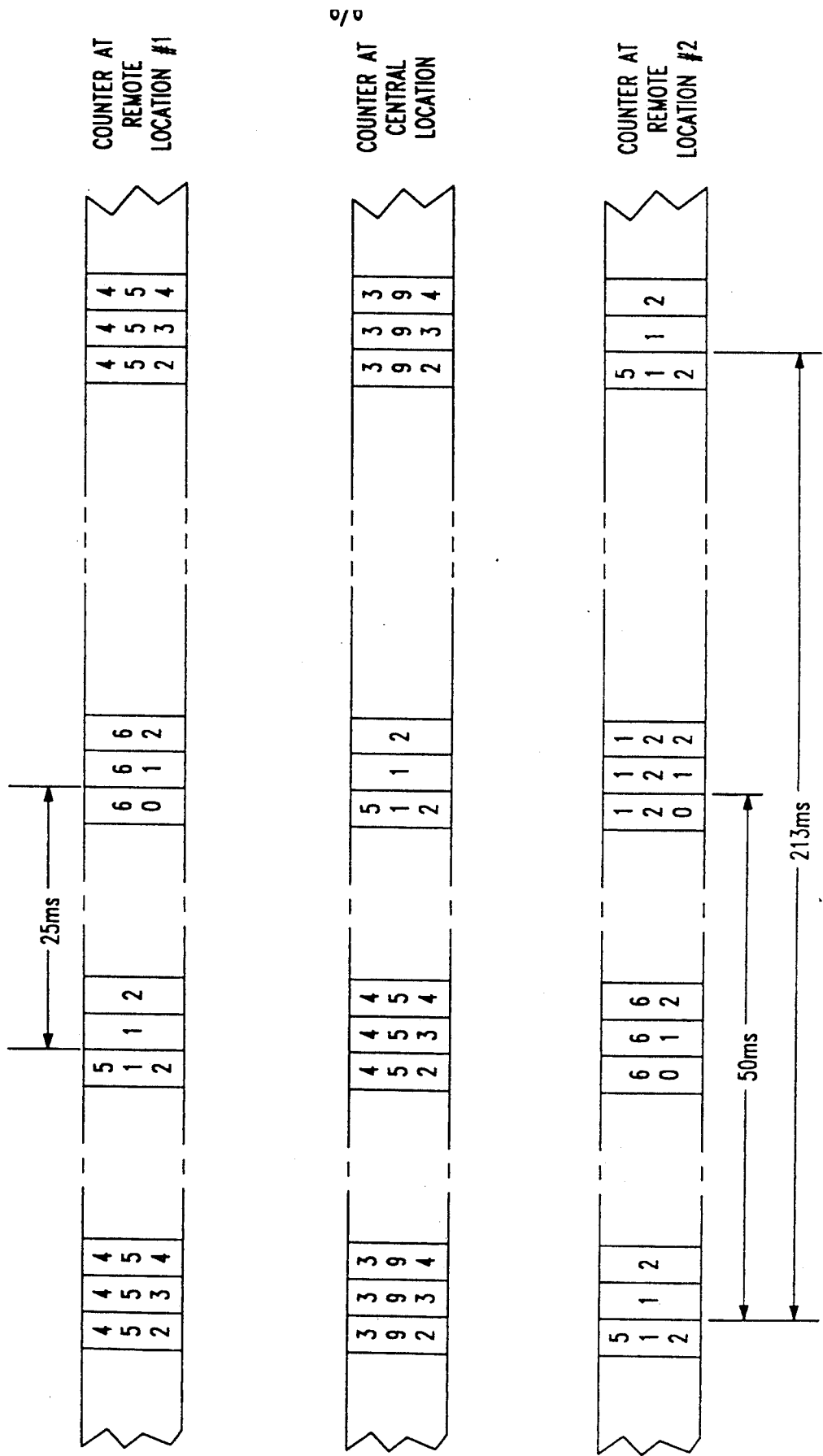
FIG. 6 is a timing diagram which illustrates the operation of each adjunct in accordance with the present invention.

Refer now to FIG. 6 which shows an illustrative offset in the TDM frame counters at two remote locations relative to the central location. In FIG. 6, each TDM frame has been arbitrarily set at 512 time slots and, therefore, the TDM frame counter in each adjunct counts modulo 512 and then resets. The symbol rate in FIG. 6 has been arbitrarily set at 2400 symbols/sec, which is typical in modem applications, and the propagation delay between remote location #12 and the central location has been assumed to be 25 milliseconds and the propagation delay between remote location #2 and the central location has been assumed to be 50 milliseconds. Each of these propagation delays includes the delay through the modems at both a remote and the central location. For the illustrative symbol rate, a delay of 25 milliseconds equates to an offset of 60 time slots between the TDM frame counter at remote location #1 and the central location, and a delay of 50 milliseconds corresponds to an offset of 120 time slots between the TDM frame counter at remote location #2 relative to the TDM frame counter at the central location. Accordingly, by maintaining these offsets between the frame counters and having each location define the same TDM frame, and same intervals for each application, the system of FIG. 2 can operate with the time slot assignments of FIG. 3 to provide collision-free TDM communications between the remote and central locations. In addition, as the time interval for each application in each TDM frame is determined by a pair of counts, any such interval can be increased or decreased by merely changing the counts associated with the beginning and end of each interval. Accordingly, the bandwidth allocation to any application or channel can easily be changed dynamically.

At this juncture, it should be noted that while the method of measuring and determining the propagation delay between any remote location and the central location has not been discussed, such measurement and determination can be provided in any of a variety of well-known techniques. For example, during network initialization, a remote location can start with an initial arbitrary TDM frame and then transmit a predetermined test sequence to the central location at the beginning of this frame. The central location, upon receipt, would communicate back to the transmitting remote location the current count of its TDM counter. This count is a measure of the amount of offset between the TDM counters at the central and transmitting remote location and can be used by the tributary modem to reinitialize its TDM counter to the proper value. By repeating this process for each remote location, the necessary offset between the TDM frames at each remote location and the central location can be determined.

It should, of course, be noted that while the present invention has been described in terms of an illustrative embodiment, other arrangements will be apparent to those of ordinary skill in the art. For example, while in the disclosed embodiment a single host front-end processor 101 communicates with the master modem, a plurality of host front-end processors may be substituted for processor 101. In addition, while adjunct 204 has been described in reference to apparatus using a single microprocessor, the function of adjunct 204 can be provided by one or more appropriately programmed general-purpose processors, or special-purpose integrated circuits, or digital signal processors, or an analog or hybrid counterpart of any of these devices. Also, while the present invention has been illustrated for a multipoint, multiapplication polling network utilizing a specific polling protocol wherein communications from any remote to the central location follows a poll or request from the central location, the present invention is not restricted to polling systems. Indeed, the present invention can be applied to any multipoint, multiapplication network for which propagation delays from the remote locations to the central location are significant and substantially different. Finally, while the invention is disclosed herein in connection with analog voiceband modems, the inventive concept is equally applicable to so-called digital modems, otherwise referred to as data service units.

I claim:

1. Apparatus for use in a multipoint network wherein each of a plurality of remote locations transmits information signals to a central location using time-division multiplexed frames, each of said information signals being associated with a different data application so that said network transports communications for a number of different data applications, and wherein transmission of any information signal between any remote location and said central location has an associated propagation delay, said apparatus comprising means for establishing recurring time-division multiplexed frames at one of said remote locations, each of said frames including a time interval for each of said different data applications, the total number of such time intervals in each frame being dependent upon the number of different data applications in said network and being independent of the number of remote locations in said plurality, the established time-division multiplexed frame at said one remote location being offset relative to a time-division multiplexed frame at said central location, said offset being equal to the propagation delay associated with transmission between said one remote location and said central location; and means for transmitting said information signals from said one remote location to said central location in accordance with the established time-division multiplexed frames at said one remote location.

2. The apparatus of claim 1 wherein said establishing means establishes time-division multiplexed frames at said one remote location which are identical to those at said central location except for said offset.

3. The apparatus of claim 1 wherein said establishing means includes a microprocessor for establishing the time-division multiplexed frames.

4. The apparatus of claim 1 wherein said establishing means includes a counter for establishing the time-division multiplexed frames.

5. The apparatus of claim 4 wherein said counter provides outputs which define the time intervals in each time-division multiplexed frame.

6. The apparatus of claim 1 wherein said transmitting means includes a microprocessor for controlling transmission of said information signals to said central location.

7. The apparatus of claim 1 wherein said establishing means at said one remote location includes means for determining the propagation delay associated with said one remote location.

8. Apparatus for use in a multipoint network wherein each of a plurality of remote locations transmits information signals to a central location using time-division multiplexed frames, each of said information signals being associated with a different data application so that said network transports communications for a number of different data applications, and wherein transmission of any information signal between any remote location and said central location has an associated propagation delay, said apparatus comprising means for establishing recurring time-division multiplexed frames at said central location, each of said frames including a time interval for each of said different data applications, the total number of such time intervals in each frame being dependent upon the number of different data applications in said network and being independent of the number of remote locations in said plurality, the established time-division multiplexed frame at said central location being offset relative to a time-division multiplexed frame at each remote location, said offset being equal to the propagation delay associated with transmission between that remote location and said central location; and means for receiving said information signals at said central location in accordance with the established time-division multiplexed frames at said central location.

9. The apparatus of claim 8 wherein said establishing means establishes time-division multiplexed frames at said central location which are identical to those at each remote location except for said offset.

10. The apparatus of claim 8 wherein said establishing means includes a microprocessor for establishing the time-division multiplexed frames.

11. The apparatus of claim 8 wherein said establishing means includes a counter for establishing the time-division multiplexed frames.

12. The apparatus of claim 11 wherein said counter provides outputs which define the time intervals in each time-division multiplexed frame.

13. The apparatus of claim 8 wherein said transmitting means includes a microprocessor for controlling transmission of said information signals to said central location.

14. The apparatus of claim 8 wherein said establishing means at said central location includes means used for determining the propagation delay associated with each remote location and said central location.

15. A method for use in a multipoint communications system wherein each of a plurality of remote locations transmits information signals to a central location using time-division multiplexed frames, each of said information signals being associated with a different data application so that said network transports communications for a number of different data applications, and wherein transmission of any information signal between any remote location and said central location has an associated propagation delay, said method comprising the steps of establishing recurring time-division multiplexed frames at one of said remote locations, each of said frames including a time interval for each of said different data applications, the total number of such time intervals in each frame being dependent upon the number of different data applications in said network and being independent of the number of remote locations in said plurality, the established time-division multiplexed frame at said one remote location being offset relative to a time-division multiplexed frame at said central location, said offset being equal to the propagation delay associated with transmission between said one remote location and said central location; and transmitting said information signals from said one remote location to said central location in accordance with the established time-division multiplexed frames at said one remote location.

16. A multipoint network wherein each of a plurality of remote locations transmits information signals to a central location using time-division multiplexed frames, each of said information signals being associated with a different data application so that said network transports communications for a number of different data applications, and wherein transmission of any information signal between any remote location and said central location has an associated propagation delay, said multipoint network comprising means for establishing recurring time-division multiplexed frames at said central location and each of said remote locations, each of said frames including a time interval for each of said different data applications, the total number of such time intervals in each frame being dependent upon the number of different data applications in said network and being independent of the number of remote locations in said plurality, the established time-division multiplexed frame at each remote location being offset relative to a time-division multiplexed frame at said central location, said offset being equal to the propagation delay associated with transmission between that remote location and said central location;

means for transmitting said information signals from each remote location to said central location in accordance with the established time-division multiplexed frames at that remote location; and means for receiving said transmitted information signals at said central location and processing them in accordance with the established time-division multiplexed frame at said central location.

17. Apparatus for use in a multipoint network wherein each of a plurality of remote locations transmits information signals to a central location using time-division multiplexed frames, each of said information signals being associated with a different data application so that said network transports communications for a number of different data applications, and wherein transmission of any information signal between any remote location and said central location has an associated propagation delay, said apparatus comprising means for establishing recurring time-division multiplexed frames at one of said remote locations, each of said frames including a time interval for each of said different data applications, the total number of such time intervals in each frame being dependent upon the number of different data applications in said network and being independent of the number of remote locations in said pulrality, and means for offsetting the established time-division multiplexed frame at said one remote location relative to a time-division multiplexed frame at said central location, said offset being equal to the propagation delay associated with transmission between said one remote location and said central location.

18. The apparatus of claim 17 wherein said apparatus is an adjunct to a modem.

19. Apparatus for use in a multipoint network wherein each of a plurality of remote locations transmits information signals to a central location using time-division multiplexed frames, each of said information signals being associated with a different data application so that said network transports communications for a number of different data applications, and wherein transmission of any information signal between any remote location and said central location has an associated propagation delay, said apparatus comprising means for establishing recurring time-division multiplexed frames at said central location, each of said frames including a time interval for each of said different data applications, the total number of such time intervals in each frame being dependent upon the number of different data applications in said network and being independent of the number of remote locations in said plurality, and means for offsetting the established time-division multiplexed frame at said central location relative to a time-division multiplexed frame at one of said remote locations, said offset being equal to the propagation delay associated with transmission between said one remote location and said central location.

20. The apparatus of claim 19 wherein said apparatus is an adjunct to a modem.

* * * * *